United States Patent [19]
Kawano

[11] Patent Number: 5,500,704
[45] Date of Patent: Mar. 19, 1996

[54] APPARATUS FOR PARTIALLY INTERCEPTING LIGHT IN FINDER OF CAMERA

[75] Inventor: Kiyoshi Kawano, Tokyo, Japan

[73] Assignee: Asahi Kogaku Kogyo Kabushiki Kaisha, Tokyo, Japan

[21] Appl. No.: 443,263

[22] Filed: May 17, 1995

[30]  Foreign Application Priority Data

May 17, 1994 [JP] Japan .................................. 6-126795

[51] Int. Cl.⁶ .............................................. G03B 13/10
[52] U.S. Cl. ................................................ 354/222
[58] Field of Search ................................. 354/159, 222

[56]  References Cited

U.S. PATENT DOCUMENTS 3,875,579  4/1975  Mochizuki .............................. 354/481
4,987,436  1/1991  Misawa ................................... 354/159
5,010,357  4/1991  Misawa ................................... 354/159
5,335,031  8/1994  Ogawa .................................... 354/159
5,345,285  9/1994  Hasushita et al. ..................... 354/159
5,367,351  11/1994  Suzuka .................................. 354/159
5,386,259  1/1995  Ichikawa et al. ..................... 354/222
5,412,443  5/1995  Suzuka .................................. 354/159

Primary Examiner—David M. Gray
Attorney, Agent, or Firm—Greenblum & Bernstein

[57] ABSTRACT

A light interceptor for a viewfinder having a finder block in a camera includes mask elements formed of a flexible thin plate to vary the size of the field frame of the viewfinder. A selection switch is actuated to vary the size of the field frame and a power transmission mechanism is provided to move the mask elements along the finder block in association with a position of the selection switch. A guide member is provided to guide movement of a front or rear end of the mask elements in a direction perpendicular to the optical axis of the viewfinder along the surfaces of the finder block.

11 Claims, 3 Drawing Sheets

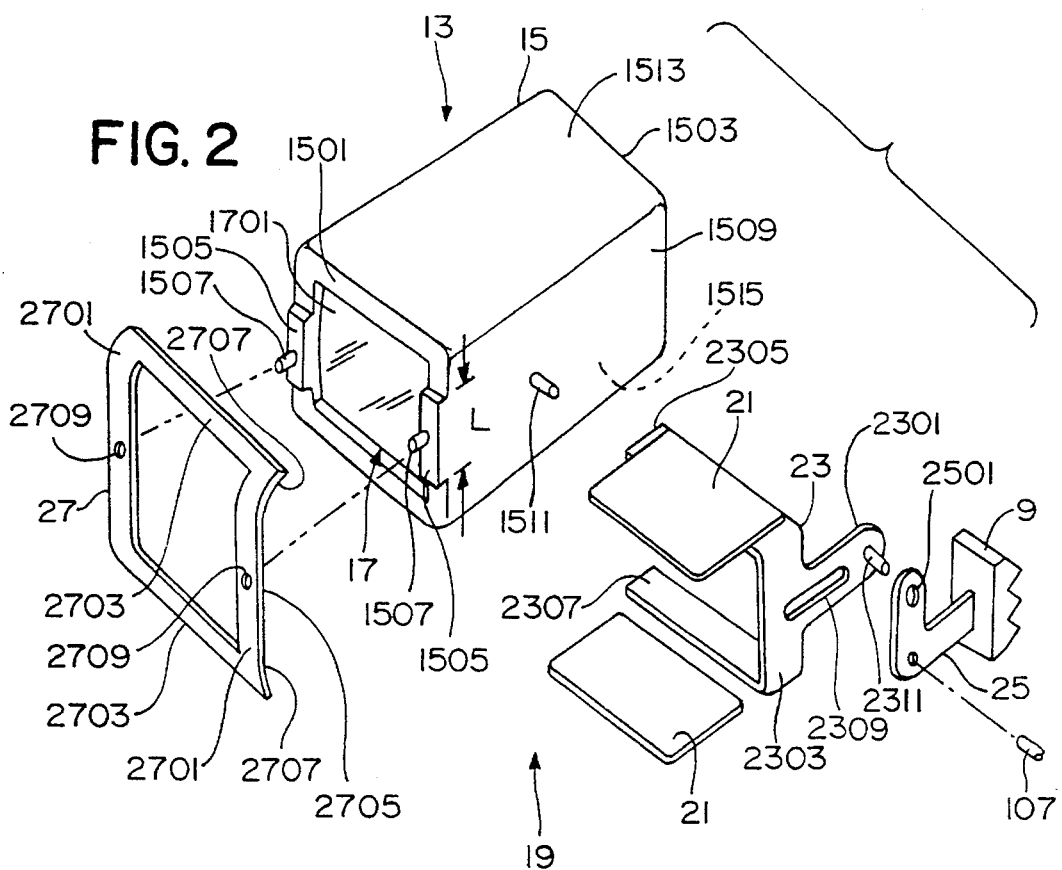
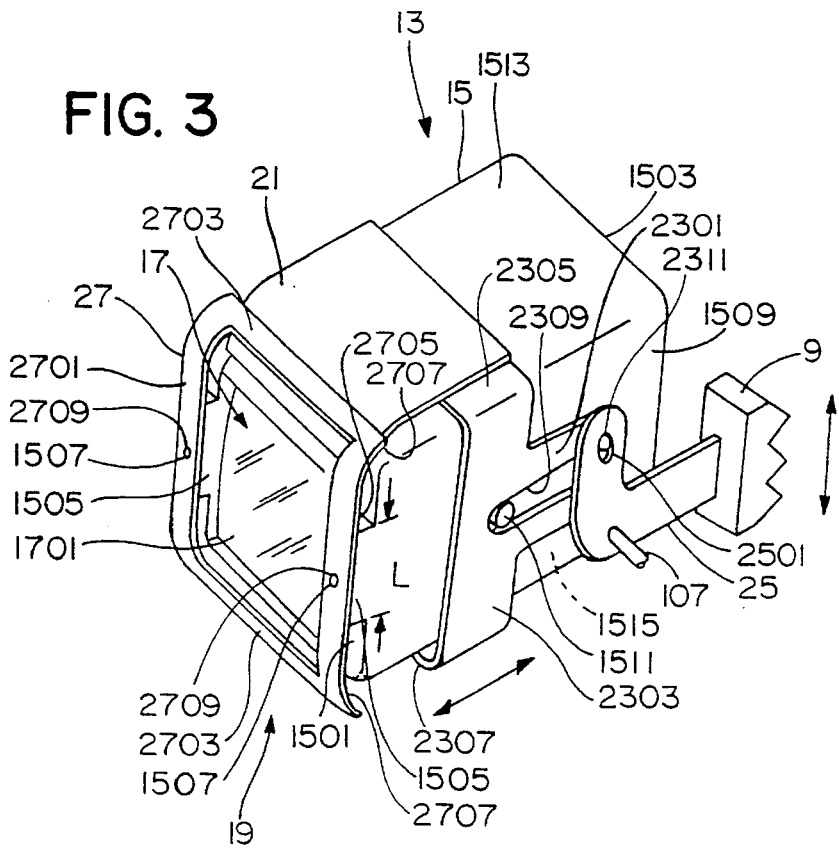

APPARATUS FOR PARTIALLY INTERCEPTING LIGHT IN FINDER OF CAMERA

BACKGROUND OF THE INVENTION

1. Field of the Invention

The present invention relates to a light interceptor which partially intercepts light in a viewfinder of a camera to vary the size of a field frame of the viewfinder.

2. Description of the Related Art

In general, a camera includes a viewfinder through which a photographer can view an object to be taken (or photographed) by a photographing lens system. The viewfinder is comprised of, for example, a finder lens system and a hollow finder block having a generally rectangular cross-sectional shape for holding the finder lens system. The finder block is provided in the camera body, so that the rear end of the finder block is attached to an ocular window which opens into the back surface of the camera body.

In a camera such as a lens shutter type camera, in which the photographing lens system is separate from the finder lens system, a finder window opens into the front surface of the camera body. The finder block is attached at the front end thereof to the finder window. Consequently, an optical image of an object to be photographed is conveyed from the front end of the finder block to the finder lens system through the finder window.

In a camera such as a single lens reflex camera, in which the photographing lens system constitutes a part of the finder lens system, the optical image of the object taken by the photographing lens is conveyed to the front end of the finder block and then to the finder lens system, through a movable (rotatable or tiltable) mirror or a prism, etc.

Recently, cameras having different photographing modes, including a panoramic mode, which can be selected by a mode selection switch to take a panoramic picture have been proposed.

In such cameras, upon taking a panoramic picture, an optical image of an object to be taken is exposed on a partially elongated area of a picture plane of a film which is obtained by partially removing (i.e., not exposing) the upper and lower edges of the picture plane for one frame of the film.

Accordingly, a viewfinder in a camera which can take a panoramic size picture is provided with a light intercepting mechanism which intercepts light to the upper and lower edges of the field frame corresponding to the area of the film which is not exposed.

In a conventional partial light interceptor, a pair of upper and lower arms are provided. The arms are supported at the side portions of the finder block close to the front end thereof to swing in the upward and downward directions. A mask member, which is attached to the front end of each of the upper and lower arms, extends to lie in front of the finder block.

The upper and lower arms are swingable in opposite directions in association with a mode selection switch, which is actuated to change the photographing mode between the standard size picture mode and the panoramic size picture mode.

When the panoramic mode is selected by the mode selection switch, the upper and lower arms swing downward and upward, respectively, so that the mask members of the upper and lower arms move in front of the finder block to partially interrupt the field frame of the viewfinder. The limited field frame corresponds to the exposed film area of the panoramic mode.

When the standard mode is selected by the mode selection switch, the upper and lower arms moved (swing) upward and downward, respectively, so that the mask members move upward and downward, respectively. Consequently, the mask members are retracted from the field frame of the viewfinder.

However, in the conventional partial light interceptor, since the mask members swing (rotate) along circular loci about the supporting shafts of the arms in front of the finder block through the respective arms, it is necessary to provide, above and below the finder block, a space large enough to prevent the mask members from interfering with the elements located around the finder block, thereby increasing the size of the camera body.

SUMMARY OF THE INVENTION

The primary object of the present invention is to provide a light intercepting apparatus for a viewfinder which can be incorporated in a small camera.

To achieve the object mentioned above, according to the present invention, an apparatus is provided for partially intercepting light in a viewfinder of a camera including a finder block to be attached to a camera body and a mask member which varies the size of a field frame of the viewfinder. The mask member is made of a flexible and optically interceptive thin plate. A selection switch is actuated to vary the size of the field frame of the viewfinder. A power transmission mechanism moves the mask member along the upper and lower surfaces or side surfaces of the finder block in association with the operation of the selection switch. A guide member is provided at the front or rear end of the finder block to guide the movement of a front end or a rear end of the mask member in a direction perpendicular to the optical axis of the viewfinder along the front or rear end of the finder block.

According to another aspect of the present invention, an apparatus is provided for partially intercepting light in a viewfinder of a camera, including a mask member which is made of a flexible and optically interceptive thin plate. The mask member is positioned in a plane parallel to an optical axis of the viewfinder during normal mode photography. Thus, the mask member does not intercept a finder frame of the viewfinder. A moving mechanism is also provided to move the mask member along a plane in which the mask member lies when partial interception of of the viewfinder is executed. A guide member guides a front end or a rear end of the mask member in a direction perpendicular to the optical axis of the viewfinder whereby the front end or rear end of the mask member partially intercepts a finder frame of the viewfinder.

Furthermore, according to another aspect of the present invention, a method is provided for partially intercepting light in a viewfinder of a camera having a mask member made of a flexible and optically interceptive thin plate. The method includes positioning the mask member in a plane parallel to an optical axis of the viewfinder when no interception of the viewfinder is executed, whereby the mask member does not intercept the finder frame of the viewfinder, and bending a front end or a rear end of the mask member in a direction perpendicular to the optical axis of the viewfinder, whereby the front end or rear end of the mask member partially intercepts a finder frame of the viewfinder.

The present disclosure relates to subject matter contained in Japanese patent application No.06-126795 (filed on May 17, 1994) which is expressly incorporated herein by reference in its entirety.

BRIEF DESCRIPTION OF THE DRAWINGS

The invention will be described below in detail with reference to the accompanying drawings, in which;

FIG. 2 is an exploded perspective view of a viewfinder and a light intercepting mechanism, according to an embodiment of the present invention;

FIG. 3 is a perspective view of a viewfinder provided in a camera having a light intercepting mechanism shown in FIG. 2;

DESCRIPTION OF THE PREFERRED EMBODIMENT

Figure 1A:
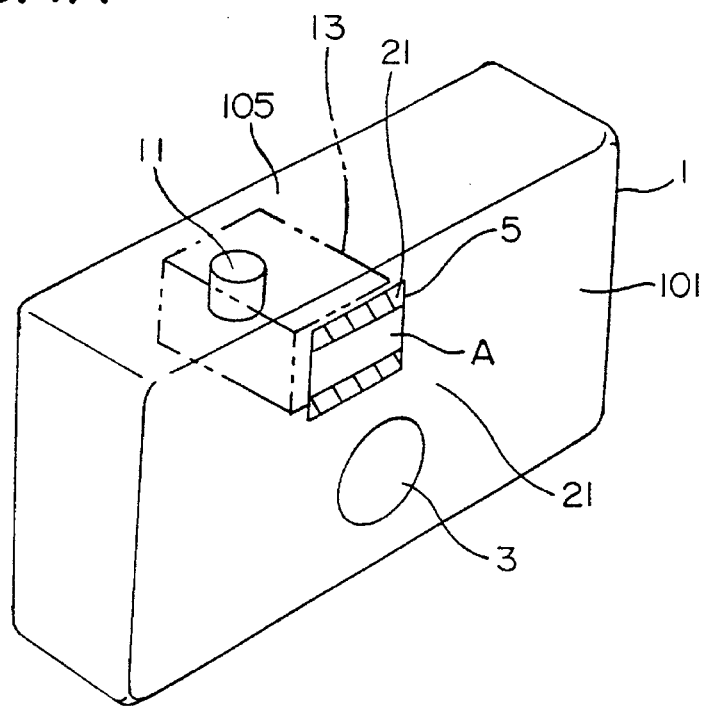
FIGS. 1A and 1B are front and rear perspective views of a lens shutter type camera to which the present invention is applied, respectively.

As shown in FIG. 1A, a camera body 1 is provided, on a generally center portion of a front surface 101 thereof, with a photographing lens 3. A finder window 5 is dispersed on the front surface 101 of the camera body 1 above the photographing lens 3.

Figure 1B:
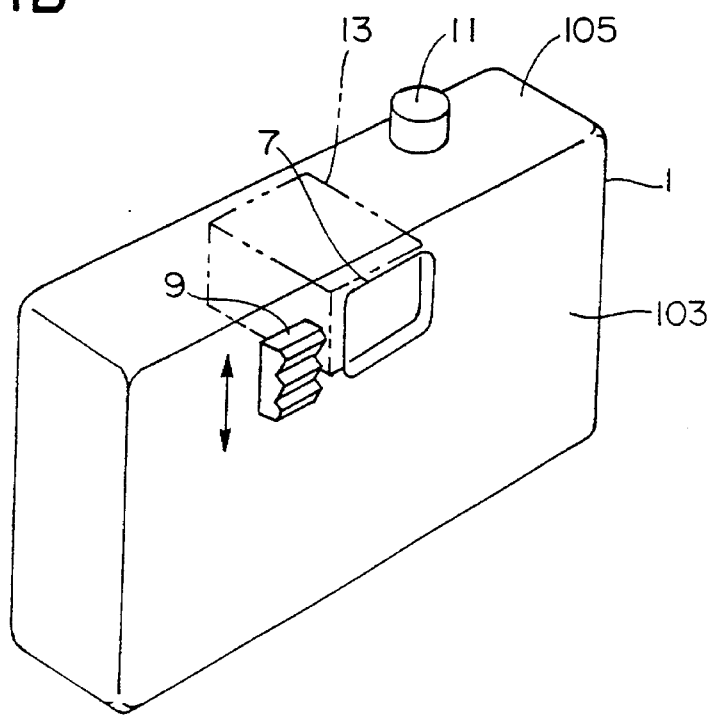

Referring now to FIG. 1B, the camera body 1 is also provided, on a rear surface 103 thereof, with an ocular window 7 opposed to the finder window 5. A mode selecting switch 9 is provided on the rear surface 103 of the camera body 1 on the left side of the ocular window 7. The mode selection switch 9 is slidable in the vertical direction. A release switch 11 is provided on the upper surface 105 of the camera body 1.

The viewfinder 13 is provided in a space between the finder window 5 and the ocular window 7 within the camera body 1.

FIG. 2 shows an exploded perspective view of the finder 13 and the light intercepting mechanism (light interceptor) 19. The finder 13 includes of a hollow finder block 15 having a generally rectangular cross-sectional shape, and a finder lens system 17 held in the finder block 15.

The finder block 15 has a front end 1501 which faces the finder window 5 and a rear end 1503 which faces the ocular window 7. An image of an object (not shown) to be photographed is conveyed to the finder lens system 17 from the front end 1501 of the finder block 15 through the finder window 5, so that the object image can be viewed through the ocular window 7.

The finder block 15 is provided on laterally opposed ends of the front surface 1501 thereof with right and left side projections 1505 located at a substantially center portion in the vertical direction. The projections have rectangular cross-sections which serve as stoppers, and are each provided on the center portion thereof with a mounting pin 1507.

The length L of the projections 1505 in the vertical direction corresponds to the length (height) of the field frame of the finder 13 corresponding to the area of the film (not shown) in panoramic mode.

It should be noted that the present invention can also be applied to conventional cameras in which printing area data is recorded on the film without changing the area of the film exposed upon varying the size of the picture plane. In this application, the mechanical size switching device to vary the film area to be exposed is unnecessary.

A guide pin 1511 is provided on one side wall 1509 of the finder block, 15 and is located slightly closer to the front end 1501 of the finder block 15 at a substantially center portion in the vertical direction thereof.

The finder lens system 17 is comprised of a plurality of lenses (not shown) including a first lens 1701. These lenses, whose optical axes are aligned, are held in the finder block 15. The first lens (frontmost lens) 1701 is located at the front end of the finder block 1501.

The (partial) light interceptor 19, which varies the size of the field frame of the finder 13, is provided in the finder block 15. When the selection switch 9 is slid downward, the field frame is set at the standard photographing mode by the light interceptor 19. Conversely, when the selection switch 9 is slid upward, the field frame is set at the panoramic photographing mode.

The light interceptor 19 includes a pair of upper and lower mask elements 21, a sliding frame 23 which holds the mask elements 21, an intermediate lever 25 which moves the sliding frame 23, and a guide frame 27 which guides the movement of the mask elements 21.

Each of the mask elements 21 is made of a flexible and optically interceptive thin plate, such as a monochrome film or metal thin plate, etc., and has a width corresponding to the lateral width of the finder block 15, as shown in FIGS. 2 and 3.

The sliding frame 23 includes a base plate 2301 which lies in a plane parallel with the side wall 1509 of the finder block 15; a vertical plate 2303 connected to the front end of the base plate 2301 to lie in a vertical plane; and upper and lower plates 2305 and 2307 connected to the upper and lower ends of the vertical plate 2303 to lie in planes parallel with the upper and lower surfaces 1513 and 1515 of the finder block 15, respectively.

The upper and lower plates 2305 and 2307 are provided with mask elements 21, adhered or connected thereto by means of thermal-welding or screws at the base ends of the mask elements 21. The base plate 2301 is provided with an elongated hole 2309, which extends in the horizontal direction from the rear end thereof toward the vertical plate 2303, and a pin 2311 at the rear end of the base plate 2301. The generally L-shaped intermediate lever 25 is pivotally supported in the camera body 1 through a pivot pin 107 provided on the camera body 1 so as to rotate or swing about the pivot pin at the intermediate portion of the intermediate lever 25. The intermediate lever 25 is provided on one end thereof with an elongated hole 2501. The other end of the intermediate lever 25 extends toward the rear surface 103 of the camera body 1, so that the selection switch 9 is attached to the rear end of the intermediate lever 25. The sliding frame 23 and the intermediate lever 25 constitute a power transmission mechanism.

The guide frame 27 is provided with right and left vertical elements 2701, whose length is longer than the vertical length of the finder block 15, and upper and lower horizontal elements 2703, whose length corresponds to the lateral width of the finder block 15.

The vertical elements 2701 are provided, on the intermediate portions thereof, with linear guide portions 2705 and on the opposite ends, and with arched guide portions 2707 smoothly curved toward the rear end 1503 of the finder block 15. The intermediate linear guide portions 2705 are provided on the intermediate portions thereof with holes 2709.

The light interceptor 19 is assembled as follows.

The guide pin 1511 is fitted in the elongated hole 2309 to attach the sliding frame 23 to the finder block 15. The pin 2311 is fitted in the elongated hole 2501 of the intermediate lever 25 to attach sliding frame 23 to the intermediate lever 25. Consequently, the upward or downward movement of the selection switch 9 causes the sliding frame 23 to move forward or backward along the finder block 15, respectively.

To attach the guide frame 27 to the finder block 15, the mounting pins 1507 are fitted in the corresponding holes 2709. The projections 1505 are thermally bonded or adhered to the vertical elements 2701, so that the front ends of the mask elements 21 are located between the horizontal elements 2703 and the front end 1501 of the finder block 15, as shown in FIG. 4.

Figure 4:
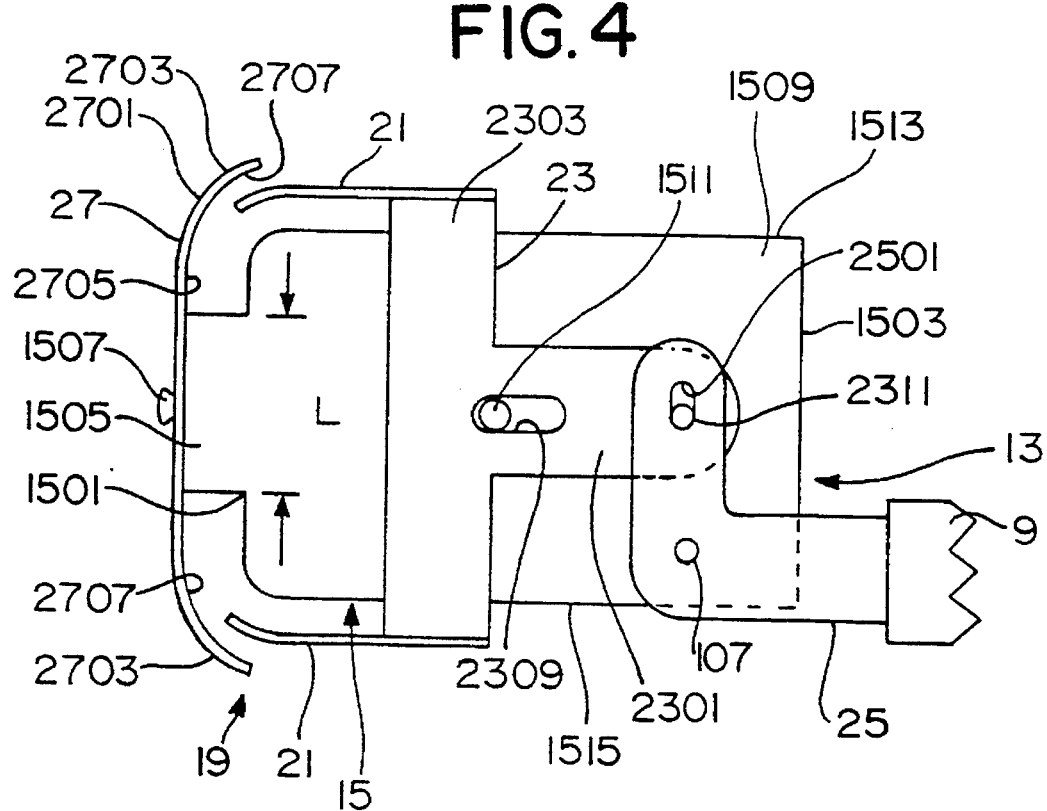
FIG. 4 is a side elevational view of a light intercepting mechanism shown in FIG. 3 at a normal or standard photographing mode; and, FIG. 5 is a side elevational view of a light intercepting mechanism shown in FIG. 3 at a panoramic photographing mode.
Figure 5:
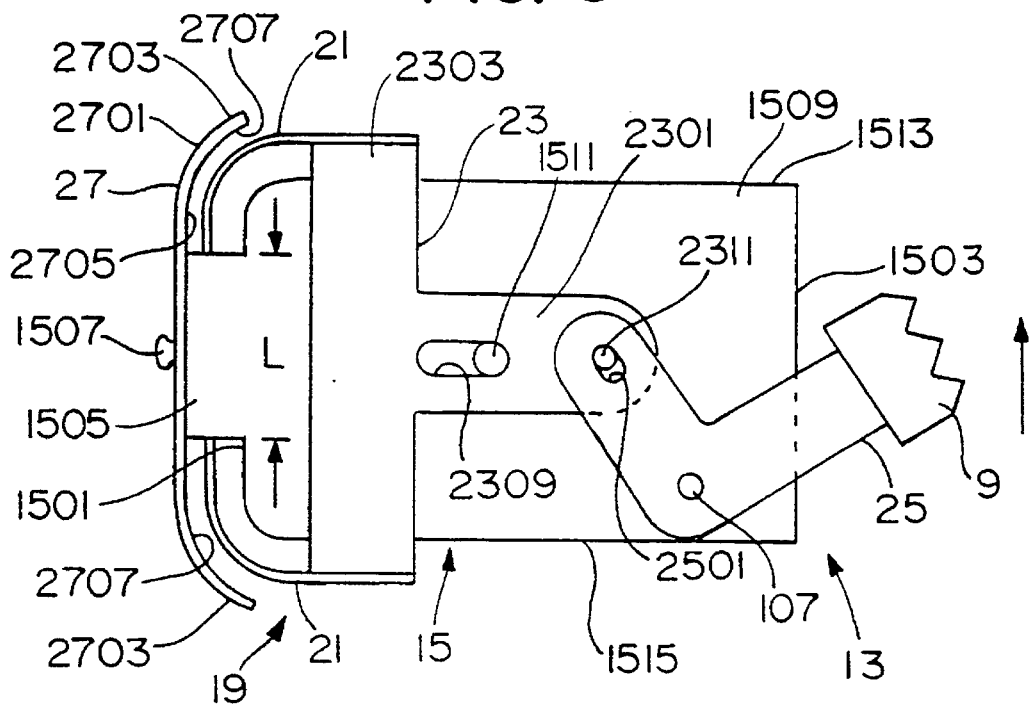

When the selection switch 9 is moved downward to establish the standard photographing mode, mask elements 21 retract into the spaces defined above and below the first lens 1701, as shown in FIG. 4. When the selection switch 9 is moved upward to establish the panoramic photographing mode, as shown in FIG. 5, the front ends of the mask elements 21 move in front of the first lens 1701 and abut against the projections 1505. Hence, the elongated field frame "A" (FIG. 1A) corresponding to the panoramic view is defined by the upper and lower mask elements 21.

As can be seen from the foregoing, according to the present invention, the field frames for the standard photographing mode and the panoramic photographing mode are selectively obtained by the upper and lower mask elements 21, which are moved by the operation of the selection switch 9.

The locus of the movement of the mask elements 21 consists of a linear portion extending along the upper and lower surfaces 1513 and 1515 of the finder block 15 (shown in FIG. 4), an arched portion corresponding to arched guide portions 2707 above and below the front end 1501 of the finder block 15 (as shown in FIG. 5), and a linear portion corresponding to the associated linear guide portion 2705 at the front end 1501 of the finder block 15. This arrangement isolates the loci of movement of the mask element in relative proximity to finder block 15, in comparison with the conventional arrangement in which the mask elements swing. Consequently, a large space for accommodating the light interceptor around the finder block 15 is not necessary. This contributes to a miniaturization of a camera.

In the near future, the panoramic mode will be available not only in compact cameras but also in large cameras having an inverted Galilean finder. If the light interceptor 19 according to the present invention is incorporated in such large cameras, the previously mentioned technical effects will be enhanced.

Although the mask elements 21 are slid on the front end side (front end 1501) of the finder block 15 in the illustrated embodiment, it is possible to slide the mask elements 21 on the rear end side (rear end 1503) of the finder block 15. Moreover, although the mask elements 21 are slid by the sliding frame 23 and the intermediate lever 25, etc., the actuator (driving mechanism) to move the mask elements 21 is not limited to the illustrated embodiment.

Furthermore, although the above discussion has been directed to a lens shutter type camera, in which the photographing lens system is separate from the finder lens system, the present invention can be equally applied to a camera such as a single lens reflex camera.

In the above discussion, the finder 13 is comprised of the hollow finder block 15 and the finder lens system 17 held in the finder block 15. The present invention can be also applied to a camera having a viewfinder formed only by a single finder block or a camera having a finder block which is not hollow, as in the Albada type inverted Galilean finder.

Moreover, the present invention can be applied to a camera which utilizes a half-size photographing mode, in which an object image is exposed in one-half the film area for one frame of the film, or a camera in which parallax correction is indicated within the finder in a macro-photographing mode. In such an application, the structure of the light interceptor can be modified. For example, the mask elements 21 can be provided on the side walls 1509 of the finder block 15. Alternatively, it is possible to provide a single mask element.

Consequently, the track of the movement of the mask member can be located as close to the finder block as possible. Hence, the space around the finder block, necessary to accommodate the light interceptor can be considerably reduced, thus resulting in a miniaturization of a camera.

I claim:

1. An apparatus for partially intercepting light in a viewfinder of a camera, comprising:

a finder block associated with a camera body;

a mask member for varying a size of a field frame of the viewfinder, said mask member comprising a flexible light intercepting thin material;

a selection switch actuatable to move said mask member to vary the size of the field frame of said viewfinder;

a power transmission mechanism which moves said mask member along a surface of said finder block responsive to actuation of said selection switch; and, a guide member provided along a side of the finder block to guide the movement of said mask member in a direction perpendicular to the optical axis of the viewfinder along the side of said finder block.

2. An apparatus according to claim 1, wherein the selection switch is actuatable to select one of a field frame for a panoramic photographing mode and a field frame for a standard photographing mode.

3. An apparatus according to claim 1, wherein said mask member includes a pair of mask elements, provided on one of above and below said finder block and right and left sides of said finder block.

4. An apparatus according to claim 2, further comprising at least one stopper provided on said side of said finder block with which a leading end of said mask member comes into contact to determine a size of said field frame for said panoramic photographing mode.

5. An apparatus for partially intercepting light in a viewfinder of a camera, comprising:

a mask member of a flexible, light intercepting thin plate, and being positioned in a plane parallel to an optical axis of said viewfinder when interception of the viewfinder is not performed; whereby the mask member does not block light into a finder frame of the view finder;

a moving mechanism which moves the mask member along said plane in which said mask member lies when partial interception of the viewfinder is to be performed; and a guide member which guides a leading end of said mask member in a direction perpendicular to an optical axis of said viewfinder whereby said leading end of said mask member partially blocks light entering a finder frame of the viewfinder.

6. An apparatus according to claim 5, further comprising a selection switch which actuates said moving mechanism.

7. An apparatus according to claim 5, further comprising at least one stopper with which said leading end of said mask member comes into contact when said partial interception of said viewfinder is performed.

8. An apparatus according to claim 5, wherein said mask member includes a pair of mask elements provided on one of above and below the optical axis and right and left sides of the optical axis.

9. A method for partially intercepting light in a viewfinder of a camera having a mask member of a flexible light intercepting thin plate, comprising the steps of:

positioning said mask member in a plane parallel to an optical axis of said viewfinder when no interception of the viewfinder is executed, whereby the mask member does not intercept a finder frame of said viewfinder; and, bending a leading end of said mask member in a direction perpendicular to said optical axis of said viewfinder, whereby said leading end of said mask member partially intercepts a finder frame of the viewfinder.

10. A method according to claim 9, wherein said view finder further comprises guiding said leading end of the said mask member with a guide member in a direction perpendicular to said optical axis of said viewfinder, and wherein said bending step is executed by moving said mask member along said plane toward said guide member.

11. A method according to claim 10, wherein said mask member includes a pair of mask elements positioned one of above and below the optical axis and at right and left sides of the optical axis.

* * * * *